3,105,824
Patented Oct. 1, 1963

3,105,824

AQUEOUS FLUOROCARBON TELOMER DISPERSION AND PROCESS OF PREPARING SAME

Larry Quentin Green, Wilmington, Del., and Ralph Walter Moses, Deepwater, N.J., assignors to E. I. du Pont de Nemours and Company, Wilmington, Del., a corporation of Delaware No Drawing. Filed May 3, 1960, Ser. No. 26,428
3 Claims. (Cl. 260—29.6)

This invention is directed to a novel aqueous fluorocarbon telomer dispersion, and more particularly, to a stable dispersion in water of a fluorocarbon telomer having wax-like characteristics obtained by reacting tetrafluoroethylene in the presence of methylcyclohexane and 1,1,2-trichlorotrifluoroethane. The resultant tetrafluoroethylene telomer dispersion is useful as a lubricant in the cold forming of metals such as wire drawing, stamping and cutting as a lubricant in printing inks, as a release agent for paper, as a mold release agent, as a release agent in textile printing inks to permit ready removal of ink compositions from printing screens, as a textile sewing lubricant, as a lubricant for drilling bits including those used in oil well drilling, and as a lubricant and polish for wood, leather, plastic, and other surfaces.

It is, therefore, an object of the present invention to provide a fluorocarbon telomer in the form of a finely divided dispersion in water. Another object is to provide a useful aqueous composition of a fluorine-containing wax-like material in colloidal form. Still another object is to provide a process for readily dispersing the material in water to provide a stable, finely divided dispersion. These and other objects will become apparent in the following description and claims.

The heretofore described objects are accomplished by mixing, with a tetrafluoroethylene telomer dispersed in 1,1,2-trichlorotrifluoroethane, a water-soluble surface active agent, distilling off about one-half the 1,1,2-trichlorotrifluoroethane solvent, and slowly adding water with stirring as the solvent continues to be removed whereby the telomer is dispersed as a stable, finely divided, water-dilutable suspension in the water solution of the surface active agent.

More specifically, the present invention is directed to an aqueous dispersion of a fluorocarbon telomer stabilized with a water-soluble surface active agent, said telomer being produced by reacting, at 75° C. to 200° C., one mole of tetrafluoroethylene in the presence of from about 2 to about 3 moles of 1,1,2-trichlorotrifluoroethane, from 0.01 mole to 0.1 mole of an active telogen, and from .05% to 3% by weight of an organic peroxide catalyst based upon said tetrafluoroethylene.

This invention is also directed to a process of preparing an aqueous dispersion of the tetrafluoroethylene telomer heretofore described, which process comprises adding, to the dispersion of the telomer in 1,1,2-trichlorotrifluoroethane, a water-soluble surface active agent, distilling off about one-half of the 1,1,2-trichlorotrifluoroethane, and slowly adding water with agitation as the solvent continues to be removed whereby the telomer becomes dispersed as a stable, finely divided suspension in the water solution of said surface active agent.

The telomer taken for dispersion in a water solution of a surface active agent is that prepared by polymerizing 1 mole of tetrafluoroethylene in the presence of about 2 to about 3 moles of trichlorotrifluoroethane and 0.01 to 0.10 mole of an active telogen, this polymerization being carried out in a closed system with a peroxide catalyst at a temperature within the range of 75° C. and 200° C. and at autogenous pressure.

This telomer dispersed in 1,1,2-trichlorotrifluoroethane is obtained by use of telomerization techniques, as described, for example, in U.S. Patent No. 2,540,088. In general, the telomerization is carried out by first charging an autoclave or other pressure vessel with an active telogen, with trichlorotrifluoroethane, with a peroxide catalyst and then introducing tetrafluoroethylene gas under pressure or by passing it into the cooled reactor. The charged reaction vessel is then heated to a temperature between 75° and 200° C. and the reaction allowed to proceed. Pressures will be generated between about 300 and 600 p.s.i.g. and as the reaction nears completion, the pressure within the system will be observed to drop.

In preparing this tetrafluoroethylene telomer dispersed in 1,1,2-trichlorotrifluoroethane, it is necessary to carefully control the amounts of tetrafluoroethylene, trichlorotrifluoroethane and active telogen. For each mole of tetrafluoroethylene, it is necessary to have present, in the reaction mass, 2 to 3 moles of trichlorotrifluoroethane, and, from about 0.01 to about 0.10 mole of active telogen. If less than 0.01 mole of active telogen is used, the product is of higher molecular weight and is less wax-like, approaching, as the telogen is decreased, polytetrafluoroethylene itself. If much above 0.10 mole active telogen is used per mole of tetrafluoroethylene, the molecular weight becomes too low and the properties of the product progress from wax-like to grease-like to liquid as the amount of active telogen increases. On the other hand, if much more than 3 moles of trichlorotrifluoroethane is used per mole of tetrafluoroethylene, the dispersion is too dilute for practical purposes. If less than about 2.5 moles of the trichlorotrifluoroethane is used, the viscosity of the resultant product is very high, resulting in poor heat transfer during preparation. It is important to carry out the process within the ratios described to obtain the present novel dispersion.

It has been established by chemical analysis that the trichlorotrifluoroethane takes part in the telomerization process; said trichlorotrifluoroethane acts as a telogen to some extent. Thus, it follows that the wax-like product obtained is probably a mixture of telomers; one species being a reaction product of tetrafluoroethylene with the trichlorotrifluoroethane and another species being the reaction product of tetrafluoroethane with the actve telogen. The final product, then, is a dispersion of these wax-like compounds in the trichlorotrifluoroethane.

The trichlorotrifluoroethane may be either isomer; i.e., it may be 1,1,1-trichlorotrifluoroethane or 1,1,2-trichlorotrifluoroethane; it is preferred to use the latter isomer.

The term "active telogen" utilized according to the present invention describes a telogen which is well known in the art and is one of numerous compounds. Representative active telogens are tertiary hydrocarbons such as isobutane, methylcyclopropane, 2,2-dimethylbutane, methylcyclohexane, etc.; ethers with alpha hydrogen atoms such as tetrahydrofurane, diethylether, dioxane, etc.; amines such as trimethylamine, triethylamine, etc.; alcohols such as methanol, ethanol, isopropanol, secbutyl alcohol, cyclohexanol, etc.; bivalent sulfur compounds such as ethyl mercaptan, dimethyldisulfide, etc.

The active telogen, although present in very small amounts, contributes significantly to the obtaining of the fluorocarbon telomer without undesirable by-products. If the telomerization is carried out without the active telogen, high molecular weight products are obtained which are not wax-like. The presence of the active telogen in the amounts specified results in products having a molecular weight in the order of 2000; TFE polymers of this molecular weight have wax-like properties.

As indicated, the reaction is carried out with a peroxide catalyst. This catalyst may be any organic peroxide which generates free radicals at the reaction temperature. Based on availability of catalysts and convenience temperatures of about 75° C. to about 200° C. will usually be used and the catalyst employed will be chosen according to its ability to generate free radicals at the specific temperature selected. The catalyst usually employed will be benzoyl peroxide, di-tert-butyl peroxide, or ethyl peroxide. With di-tert-butyl peroxide, which is the preferred catalyst, a temperature of 130° C. will be used. The concentration of catalyst taken will usually be in the range of .05% to 3% by weight of TFE, the preferred amount being about 2%.

The preferred telomer is that prepared by reacting tetrafluoroethylene in the presence of 1,1,2-trichlorotrifluoroethane, methylcyclohexane, and di-tert-butyl peroxide. By way of illustrating how the telomer may be prepared the following procedure is given.

A clean, dry 10-gallon stainless steel, steam-jacketed autoclave, equipped with a cooling coil, anchor-type agitator, and intake and discharge tubes, is flushed with nitrogen and filled with a solution of 1,1,2-trichlorotrifluoroethane containing 0.76% by weight of methylcyclohexane and 0.28% by weight of di-tert-butyl peroxide. The take-off valve is set for 600 p.s.i.g. and the temperature raised to 160° C. The above 1,1,2-trichlorotrifluoroethane solution is then fed to the autoclave at a rate of 68.7 lbs. per hour. At the same time tetrafluoroethylene under a pressure of 650 to 750 p.s.i.g. is introduced into the autoclave at a rate of 20 lbs. per hour. When a steady reaction state is reached a dispersion of a tetrafluoroethylene telomer dispersed in 1,1,2-trichlorotrifluoroethane at a solids concentration of about 20% is obtained.

The surface active agent used to stabilize the aqueous dispersion of the tetrafluoroethylene telomer may be of the anionic, cationic, non-ionic, or amphoteric type. It is added to the dispersion of the telomer in the 1,1,2-trichlorotrifluoroethane solvent in which it is prepared. From about 0.05 part to 2 parts, preferably from 0.3 part to one part, of surface active agent per part of telomer may be employed. The amount of surface active agent taken will depend on the concentration of the telomer in the most dilute aqueous dispersion to be made; in general, the more dilute the dispersion the more surface active agent is required to keep the telomer particles from coagulating.

In accordance with the present invention, amounts of surface active agent less than 0.05 per part of telomer may be insufficient to provide a stable, non-coagulating dispersion, particularly at an ultimate high dilution with water to give a dispersion having a solids content of the order of 0.5%. Amounts of surface active agent in excess of 2 parts per part of telomer may be used but such amounts are generally not needed as they consume an excessive quantity of material without increasing the stability of the resultant dispersions, and may interfere with the usefulness of the telomer contained in or deposited from the dispersion.

The anionic surface active agents that may be employed in the preparation of the aqueous dispersion of this invention include sodium oleate, sodium stearate, dibutylammonium oleate, morpholine salt of oleic acid, sodium salt of wood rosin acids, potassium salt of dehydrogenated wood rosin, alkyl ($C_{12}$–$C_{16}$) sodium sulfate, alkyl ($C_{16}$–$C_{18}$) sodium sulfate, sodium salt of sulfated alkenyl ($C_{16}$–$C_{18}$) acetate, sodium $\theta$-sulfato(methyl stearate), sodium salt of naphthalenesulfonic acids/formaldehyde condensation product, sodium salt of lignosulfonic acid, sodium salt of diisobutylnaphthalenesulfonic acid, sodium salt of alkyl ($C_{12}$) benzenesulfonic acid, sodium salt of aliphatic hydrocarbon (from #40 white oil) sulfonic acid. The cationic surfactants that may be employed include dodecyltrimethylammonium acetate, trimethyltetradecylammonium chloride, trimethyloctadecylammonium chloride, hexadecyltrimethylammonium bromide, (dodecylmethylbenzyl)trimethylammonium chloride, benzyldodecyldimethylammonium chloride; N-(2-diethylaminoethyl)oleamide hydrochloride; oleic acid diester of N,N,N',N'-tetrakis(2-hydroxypropyl)ethylene diamine singly quaternized with dimethyl sulfate. Non-ionic surface-active agents that may be employed include condensation products of ethylene oxide with hexyl phenol, isooctyl phenol, hexadecanol, oleic acid, alkanethiol ($C_{12}$–$C_{16}$), alkyl ($C_{12}$–$C_{18}$) amines, sorbitan monolaurate. Alkyl($C_{12}$–$C_{16}$)methylglucamine phosphate and 2-(dimethylamino) stearic acid, methyl ester, betaine are examples of amphoteric surface-active agents (agents that are cationic with acid and anionic when alkaline) that may be employed to stabilize the aqueous dispersion of the telomer.

Preferably from one-half to three-fourths of the 1,1,2-trichlorotrifluoroethane contained in the dispersion of the tetrafluoroethylene telomer which is to be dispersed in water is removed by distillation before the water is added to make the aqueous dispersion. This avoids excessive foaming that may occur with distilling the solvent from the starting telomer dispersion when water is present together with the surface-active agent. The remainder of the solvent is removed by distillation as the water is slowly added after at least one-half of the solvent has been distilled off. Although 25% or less of the 1,1,2-trichlorotrifluoroethane originally present in the solvent dispersion of the telomer may be retained in the subsequently prepared aqueous dispersion, it is preferable to remove at least 95% of the solvent, and usually all of the solvent will be removed.

After the addition of the surface active agent water is added to the solvent dispersion of the telomer, but preferably to a 1,1,2-trichlorotrifluoroethane dispersion containing at least 50% of the telomer. The water is added slowly at first with moderate agitation to provide mixing of the aqueous and organic phases of the composition while the remainder of the solvent is distilled off. As the solvent removal nears completion the balance of the water is added to give the desired concentration of aqueous dispersion. The total amount of water will vary from 0.5 part to 2000 parts per part of tetrafluoroethylene telomer, preferably from about 2⅓ parts to 4 parts of water per part of telomer will be used to provide aqueous dispersions of from about 30% to 20% solids content. More concentrated dispersions, however, may be optionally made by adding less water. The 20% to 30% concentrated dispersion may, of course, be diluted with water to provide stable, dilute dispersions or dilute dispersions may be prepared directly by increasing the amount of water added to the aqueous system during the initial dispersion of the telomer in the water.

Representative examples illustrating the present invention follow.

The surface active agents, proportions of telomer and water and surface active agent, and conditions employed in preparing the aqueous dispersions of the telomer in Examples 1 to 4 are summarized in Table I which follows:

TABLE I.—SUMMARY OF EXAMPLES

| Ex. | Solvent Telomer Dispersion | | | Surface Active Agent | | | Solvent Removed When Water Added | | Water Added | | Telomer Content of Product Dispersion in Percent |
|---|---|---|---|---|---|---|---|---|---|---|---|
| | Amt. in g. | Percent Telomer | Amt. Telomer in g. | | Amt. in g. | Parts/Part of Telomer | Amt. in g. | Percent of Total | Amt. in g. | Parts Per Part of Telomer | |
| 1 | 1,250 | 16 | 200 | Morpholine salt of oleic acid | 166 | 0.83 | 510 | 50 | 640 | 3.2 | 20 |
| 2 | 1,500 | 20 | 300 | {Sodium alkyl ($C_{12}$) benzene-sulfonate | [1] 150 | 0.15 | } 750 | 62 | 490 | 1.6 | 31 |
| | | | | {Sodium stearate | 60 | 0.20 | } | | | | |
| 3 | 3,280 | 9.2 | 302 | Oleic acid diester of N, N, N', N'-tetrakis-(2-hydroxy-propyl) ethylenediamine singly quaternized with dimethyl sulfate. | 180 | 0.6 | 1,500 | 52 | 750 | 2.5 | 24.3 |
| 4 | 2,500 | 20 | 500 | Condensation product of ethylene oxide and isooctyl phenol. | 250 | 0.5 | 1,300 | 65 | 250 | 0.5 | 60 |

[1] The concentration of the active ingredient was 30%.

*Example 1*

ANIONIC DISPERSING AGENT

A 3 l. round bottom glass flask fitted with a half-moon stirrer, dropping funnel, and a downward condenser was charged with 1250 g. of a dispersion of tetrafluoroethylene telomer prepared as described above and dispersed in 1,1,2-trichlorotrifluoroethane to have a 16% solids content. To this telomer dispersion was added 166 g. of the morpholine salt of oleic acid. Under mild agitation and with heat from an oil bath about one-half (510 g.) of the trichlorotrifluoroethane was removed. Then 640 g. of water was slowly added through the dropping funnel while continuing the distillation of the organic solvent. When the vapor temperature reached 62° C. the heating was discontinued. The resulting product was a viscous milky-white liquid having dispersed therein the tetrafluoroethylene telomer to give a solids content of 20%. As a component of a textile printing ink the telomer dispersion provides a ready release of the ink from the printing screens.

*Example 2*

MIXED ANIONIC DISPERSING AGENTS

The reaction flask of Example 1 was charged with 1500 g. of a 20% dispersion of the tetrafluoroethylene telomer in 1,1,2-trichlorotrifluoroethane and 150 g. of an aqueous solution of a sodium alkyl ($C_{12}$) benzenesulfonate containing 30% active ingredient. The flask was heated in an oil bath, and 750 g. of 1,1,2-trichlorotrifluoroethane distilled off. Then 125 g. of water was slowly added to give a viscous grease-like material. Upon the addition of 60 g. of sodium stearate the viscous mass thinned to a fluid. At this point an additional 365 g. of water were added as the heating was continued until a total of 1200 g. of 1,1,2-trichlorotrifluoroethane was removed. The resulting product was a finely divided dispersion of the telomer having a solids content of 31% and containing none of the trichlorotrifluoroethane as free solvent. When diluted with water to provide 0.5% telomer dispersion, the dilute suspension remained stable for several days with only slight settling. The mildest agitation, such as obtained by merely inverting the container, served to redisperse any separated solid material.

By employing the product telomer dispersion as a lubricant, a beryllium-copper alloy wire can be directly drawn smoothly, uniformly, and with little or no interruption by breakage. In the absence of the subject lubricant and employing a conventional wire-drawing lubricant, the alloy wire is first coated with copper to improve the wire drawing operation and the quality of the resultant wire and the coating is subsequently removed before the wire is used. Without the copper coating with a conventional lubricant, excessive breakage and scarring of the wire and excessive wear of the die orifice take place, and the drawn wire is non-uniform in gauge.

When the product telomer dispersion is used as a cutting fluid in metal working on a lathe less tool wear is encountered than when a conventional cutting oil is employed.

*Example 3*

CATIONIC DISPERSING AGENT

To the reaction flask of Example 1 was charged 3280 g. of a 9.2% dispersion of the tetrafluoroethylene telomer in 1,1,2-trichlorotrifluoroethane and 180 g. of the oleic acid diester of N,N,N',N'-tetrakis(2-hydroxypropyl) ethylenediamine singly quaternized with dimethyl sulfate. With heating the flask in an oil bath 1500 g. of the trichlorotrifluoroethane were distilled and collected. Then 750 g. of water were added slowly while continuing the removal of the trichlorotrifluoroethane until a total amount of 2980 g. was collected. The resulting product was a smooth, white paste containing 24.3% of telomer particles having a positive electrical charge.

The product telomer dispersion provides a valuable lubricant for the sewing of cotton fabric; the needle damage to the fabric encountered in high speed sewing operations is markedly reduced.

*Example 4*

NON-IONIC DISPERSING AGENT

To the reaction flask used in the previous examples was added 2500 g. of a 20% dispersion of the tetrafluoroethylene telomer in 1,1,2-trichlorotrifluoroethane and 250 g. of a condensation product of ethylene oxide and isooctyl phenol. The flask and its contents were then heated on an oil bath until 1300 g. of the trichlorotrifluoroethane were removed. At this stage the slow, dropwise addition of 250 g. of water was begun while continuing the heating until a vapor temperature of 60° C. was reached. During this final distillation the remainder of the solvent and 165 g. of water were removed. The resulting product was a white paste that comprised 60% telomer dispersed in water with particles that were electrically neutral and thereby rendered compatible with either anionic or cationic surface active agents which might be added to the aqueous telomer dispersion or with which the telomer dispersion might come into contact.

*Example 5*

WATER-IN-OIL TYPE DISPERSION OF TELOMER

To the reaction flask previously employed was added 1250 g. of a 16% dispersion of the tetrafluoroethylene telomer in 1,1,2-trichlorotrifluoroethane, 40 g. of 9-octadecen-1-ol (technical grade from sperm oil), and 20 g. of sodium stearate. 530 g. of 1,1,2-trichlorotrifluoroethane were distilled from the mixture. Then the dropwise addition of 500 g. of water was begun with agitation while the removal of the chlorofluoroethane solvent was continued until the vapor temperature reached 55° C. A total of 900 g. of the solvent was removed together with 150 g. of the added water. The resulting product was a thick white paste containing 26% of the fluorocarbon telomer. A dispersion of 200 g. of the telomer in 150 g. of residual solvent formed a continuous phase with 350 g. of water dispersed therein. Such a water-in-oil type dispersion is a good lubricant and/or polish for leather, wood, plastic, and metal surfaces.

Any of the described water-soluble surface active agents, active telogens, and organic peroxide catalysts may be substituted in the preceding representative examples to give substantially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An aqueous dispersion of a wax-like fluorocarbon telomer stabilized with a water-soluble surface active agent, said telomer being produced by reacting, at a temperature within the range of 75° C. to 200° C., 1 mole of tetrafluoroethylene in the presence of from about 2 to about 3 moles of 1,1,2-trichlorotrifluoroethane, from 0.01 mole to 0.1 mole of an active telogen, and from 0.05% to 3%, by weight, of an organic peroxide catalyst based on said tetrafluoroethylene.

2. A composition according to claim 1 wherein the water-soluble surface active agent is the morpholine salt of oleic acid, the active telogen is methylcyclohexane and the organic peroxide catalyst is di-tert-butyl peroxide.

3. The process of preparing an aqueous dispersion of a wax-like fluorocarbon telomer stabilized with a water-soluble surface active agent, which process comprises adding a water-soluble surface active agent to the telomer produced by reacting at 75° to 200° C. 1 mole of tetrafluoroethylene in the presence of from about 2 to about 3 moles of 1,1,2-trichlorotrifluoroethane, from 0.01 mole to 0.1 mole of an active telogen, and from 0.05% to 3%, by weight, of an organic peroxide catalyst based on said tetrafluoroethylene, followed by distilling off about one-half of said 1,1,2-trichlorotrifluoroethane and slowly adding water thereto under conditions of agitation as said 1,1,2-trichlorotrifluoroethane is distilled off.

References Cited in the file of this patent

UNITED STATES PATENTS

| | | |
|---|---|---|
| 2,540,088 | Barrick | Feb. 6, 1951 |
| 2,575,041 | Bauer | Nov. 13, 1951 |
| 2,885,448 | Miller | May 5, 1959 |
| 2,993,857 | Sudhulz | July 25, 1961 |
| 2,975,132 | Ferm | Mar. 14, 1961 |